United States Patent
Burry et al.

(10) Patent No.: US 9,409,541 B2
(45) Date of Patent: Aug. 9, 2016

(54) INTERIOR TRIM PART FOR A MOTOR VEHICLE COMPRISING AN AIRBAG DOOR

(71) Applicants: Charles Burry, Angy (FR); Daniel Ory, Le Plessis Bouchard (FR)

(72) Inventors: Charles Burry, Angy (FR); Daniel Ory, Le Plessis Bouchard (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 14/526,063

(22) Filed: Oct. 28, 2014

(65) Prior Publication Data

US 2015/0151706 A1    Jun. 4, 2015

(30) Foreign Application Priority Data

Dec. 4, 2013 (FR) .................................. 13 62068

(51) Int. Cl.
    *B60R 21/20* (2011.01)
    *B60R 21/2165* (2011.01)
    *B29C 44/34* (2006.01)
    *B60R 21/205* (2011.01)

(52) U.S. Cl.
    CPC ........... *B60R 21/2165* (2013.01); *B29C 44/351* (2013.01); *B60R 21/205* (2013.01)

(58) Field of Classification Search
    CPC  B60R 21/20; B60R 21/205; B60R 21/21506; B60R 2021/21506
    See application file for complete search history.

(56) References Cited

U.S. PATENT DOCUMENTS

| 5,533,749 | A  | * | 7/1996  | Leonard  | B29C 59/007 280/728.3 |
| 6,250,669 | B1 | * | 6/2001  | Ohmiya   | B60R 21/205 280/728.2 |
| 6,322,101 | B1 | * | 11/2001 | Suizu    | B60R 21/2165 280/728.3 |
| 6,854,783 | B2 | * | 2/2005  | Teranishi | B60K 37/00 296/37.12 |

(Continued)

FOREIGN PATENT DOCUMENTS

| DE | 102008011697 A1 | 9/2009 |
| JP | 2006306230 A | 11/2006 |

(Continued)

OTHER PUBLICATIONS

Search report for related French Application No. 13 62068; report dated Jun. 10, 2014.

*Primary Examiner* — James English
(74) *Attorney, Agent, or Firm* — Miller, Matthias & Hull LLP

(57) ABSTRACT

Interior trim part for a motor vehicle comprising a body, a channel-door assembly, a sealing system and a foam layer. The body comprises a passage. The channel-door assembly is mounted on the body. The channel-door assembly comprises a channel wall and a door portion. The channel wall has an inner surface and an outer surface, the inner surface being intended to guide the deployment of an airbag, the outer surface extending along a deployment direction. The door portion is connected to the channel wall and overlies the passage. The sealing system extends around the outer surface of the channel wall, in continuous contact with the body and comprises a lip protruding from the outer surface of the channel wall. The foam layer covers the body and the door portion.

9 Claims, 2 Drawing Sheets

(56) References Cited

U.S. PATENT DOCUMENTS

| | | | |
|---|---|---|---|
| 8,469,393 B1* | 6/2013 | Siewert | B60R 21/215 280/728.3 |
| 9,039,036 B1* | 5/2015 | Roy | B60R 21/215 280/728.3 |
| 2004/0145164 A1* | 7/2004 | North | B60R 21/2165 280/732 |
| 2006/0214399 A1* | 9/2006 | Okamoto | B29C 44/1228 280/728.3 |
| 2010/0230938 A1 | 9/2010 | Mazzocchi et al. | |
| 2010/0230939 A1* | 9/2010 | Mazzocchi | B29C 44/12 280/732 |
| 2011/0062685 A1* | 3/2011 | Kim | B29C 44/1238 280/728.3 |
| 2015/0035261 A1* | 2/2015 | Roy | B60R 21/205 280/728.3 |

FOREIGN PATENT DOCUMENTS

| | | |
|---|---|---|
| JP | 2009227148 A | 10/2009 |
| JP | 2010069854 A | 4/2010 |
| JP | 2012240560 A | 12/2012 |
| KR | 20080018527 A | 2/2008 |
| WO | WO 2011/128572 A1 | 10/2011 |

\* cited by examiner

INTERIOR TRIM PART FOR A MOTOR VEHICLE COMPRISING AN AIRBAG DOOR

CROSS-REFERENCE TO RELATED APPLICATION

This application claims priority under the Paris Convention to French Patent Application No. 13 62068 filed on Dec. 4, 2013.

FIELD OF THE DISCLOSURE

The invention relates to an interior trim part for a motor vehicle, more particularly an interior trim part comprising an airbag door and a foam layer created in situ.

BACKGROUND OF THE DISCLOSURE

Motor vehicles typically include an interior trim part, such as a dashboard, a door panel, a seat, or the like, which covers an airbag module. The interior trim part comprises a door intended to open to allow the airbag to deploy. A layer of foam is often provided so that the trim part is soft to the touch.

It is conventionally known, particularly from patent U.S. Pat. No. 8,469,393, that the interior trim part comprises:
- a body forming a structural member and comprising a passage,
- a channel-door assembly mounted on the body, said channel-door assembly comprising:
  - a channel wall which is substantially tubular and has an inner surface and an outer surface, the inner surface surrounding an inside space and being intended to guide the deployment of an airbag into the passage, the outer surface being substantially cylindrical and extending along a deployment direction,
  - a door portion connected to the channel wall and overlying the passage,
- a foam layer and a skin covering said body and said door portion.

The foam layer is often produced by injecting products which react with each other into a cavity, where they inflate to cover the body and the door portion. It is therefore necessary to create a fluidtight seal between the body and the channel-door assembly.

The invention aims to provide a solution that is simple to implement and relatively inexpensive, providing a satisfactory seal between the body and the channel-door assembly and keeping the connection invisible between the body and the channel-door assembly.

SUMMARY OF THE DISCLOSURE

According to the invention, the interior trim part further comprises a sealing system extending entirely around said outer surface of the channel wall, continuously contacting said body and comprising a lip protruding from said outer surface of the channel wall.

Thus, upon insertion of the channel-door assembly into the passage, the lip flexes and then bears against the body due to elastic return, thereby providing easy implementation. In addition, the flexing of the lip upon insertion of the channel-door assembly into the passage gives the lip a concave shape facing the foam, which tends to increase the pressure of the lip against the body when the foam comes in contact with the lip. The risk of the foam passing between the lip and the body is therefore reduced. Lastly, as the lip projects from the cylindrical outer surface of the channel wall, the force resulting from the elastic return of the lip does not tend to move the channel-door assembly in the deployment direction relative to the body, which simplifies maintaining the channel-door assembly relative to the body.

According to another feature of the invention, preferably the lip is integral with the channel wall, the lip and the channel wall forming a single piece.

The lip is therefore created simultaneously with the channel wall. Creation of the lip does not require an additional operation.

According to another feature of the invention, preferably the body comprises a support portion having an inner surface of substantially cylindrical shape, defining the passage, extending along the deployment direction and facing the outer surface the channel wall, and said lip contacts the inner surface of said body.

Positioning the channel-door assembly relative to the body is thus facilitated and the risk of leakage between the channel-door assembly and the body is reduced.

According to another feature of the invention, preferably the sealing system further comprises an additional seal, and the lip comprises a plurality of rectilinear portions connected to each other by said additional seal.

This additional seal ensures a fluid-tight connection between the different lip portions, while allowing the different lip portions to adapt so as to contact the body with more independence with respect to each other than if the lip extended continuously around the outer surface.

Preferably, the additional seal is more flexible than the lip.

According to another feature of the invention, preferably said lip is a first lip, and the sealing system further comprises a second lip spaced apart from the first lip in the deployment direction.

In the case where the first lip is not sufficient to obtain a perfect seal, the pressure of the foam that has crossed the first lip is reduced, such that the foam does not cross the second lip.

According to a complementary feature of the invention, preferably the sealing system further comprises an additional seal maintained between the first lip and the second lip.

The first lip and the second lip thus also serve to maintain the additional seal.

According to another feature of the invention, preferably:
- the body comprises an upper surface and a lower surface opposite the upper surface,
- the channel-door assembly comprises a peripheral flange extending away from the passage and covering the body,
- the peripheral flange contacts the upper surface of the body and the lip contacts the lower surface of the body, such that the body is clamped between the flange and the lip of the channel-door assembly.

The lip thus also maintains the channel-door assembly relative to the body along the deployment direction.

BRIEF DESCRIPTION OF FIGURES

Other features and advantages of the invention will be apparent from the following detailed description, with reference to the accompanying drawings in which.

DETAILED DESCRIPTION OF THE DISCLOSURE

Figure 1:
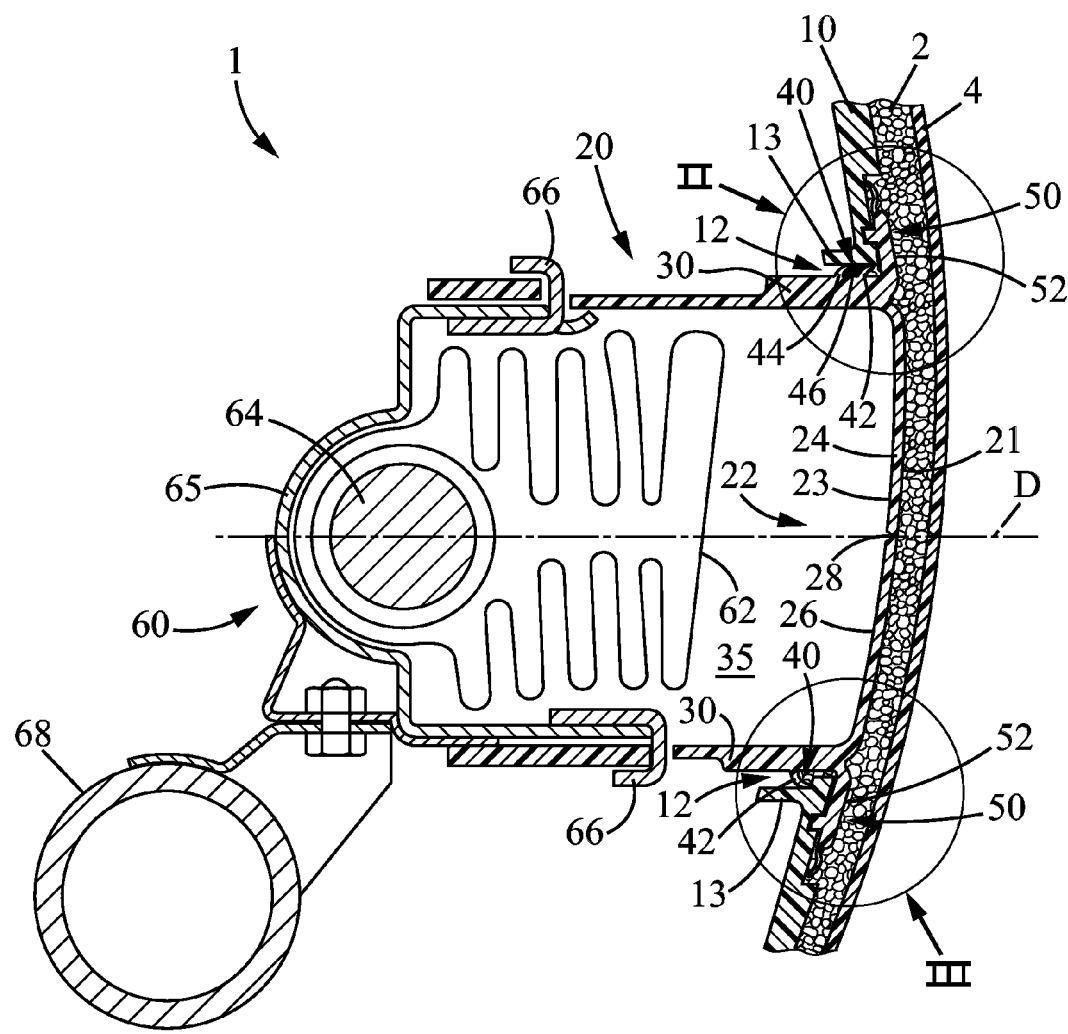
FIG. 1 is a sectional view of an interior trim part according to the invention, the upper part of the view representing a first embodiment and the lower part of the view representing a second embodiment.

FIG. 1 illustrates an interior trim part for a motor vehicle not shown. In the embodiments illustrated in FIGS. 1 to 3, the interior trim part 1 is formed by a dashboard cowl equipped with an airbag module 60. The interior trim part essentially comprises a body 10, a channel-door assembly 20, a sealing system 40, a foam layer 2, and a skin 4 that forms a covering.

The body 10 forms a structural element made of rigid material, such as polypropylene that is preferably fiber-reinforced, in particular with glass fibers, acrylonitrile butadiene styrene, or a similar material. The body 10 has an upper surface 16 and a lower surface 18. The foam layer 2 is fixed to the upper surface 16 of the body 10. The body 10 further comprises a support portion 13 having an inner surface 14 defining a passage 12 through the body 10. The inner surface 14 extends along a deployment direction D and advantageously has a substantially rectangular cross-section which remains constant along the deployment direction D. More generally, the support portion 13 has a generally tubular shape extending along the deployment direction D and the inner surface 14 is cylindrical.

The channel-door assembly 20 essentially comprises a channel wall 30, a door portion 22, and a flange 50, forming a single piece obtained in a single molding operation. The channel-door assembly 20 is mounted on the body 10; more precisely the channel-door assembly 20 is received in the passage 12. Such a channel-door assembly 20 is usually called a mushroom-type "chute-channel". The channel-door assembly 20 is preferably made of a more flexible material than the body 10, such as a thermoplastic elastomer material.

The channel wall 30 is substantially tubular in shape, extending along the deployment direction D. The channel wall 30 has an inner surface 32 and an outer surface 34. The inner surface 32 encloses an inside space 35 intended for guiding the deployment of an airbag 62 into the passage 12. The outer surface 34 is substantially cylindrical in shape, extending along the deployment direction D and advantageously has a substantially rectangular cross-section. The outer surface 34 faces the inner surface 14 of the body 10.

The door portion 22 is directly connected to the channel wall 30 and overlies the passage 12. The door portion 22 has an upper surface 21 and a lower surface 23. The door portion 22 comprises a first flap 24 and a second flap 26. An H-shaped mechanically weakening line of reduced thickness 28 is designed to facilitate the opening of the first and second flaps 24, 26 during deployment (inflation) of the airbag 62. The upper surface 21 of the door portion 22 is covered by the foam layer 2, while the lower surface 23 of the door portion 22 defines the inside space 35.

The peripheral flange 50 is joined directly to the channel wall 30 and extends around the door portion 22. The peripheral flange 50 has an upper surface 52 and a lower surface 54. The foam layer 2 covers the upper surface 52 of the peripheral flange 50 and the lower surface 54 faces the upper surface 16 of the body 10 against which the lower surface 54 of the peripheral flange 50 rests.

The airbag module 60 comprises, in addition to the airbag 62, a pyrotechnic inflation system 64 and a support 65 held by hooks 66 on the channel wall 30 of the channel-door assembly 20. The support 65 of the airbag module 60 is also rigidly fixed to a crosspiece 68 supporting the dashboard cowl.

Figure 2:
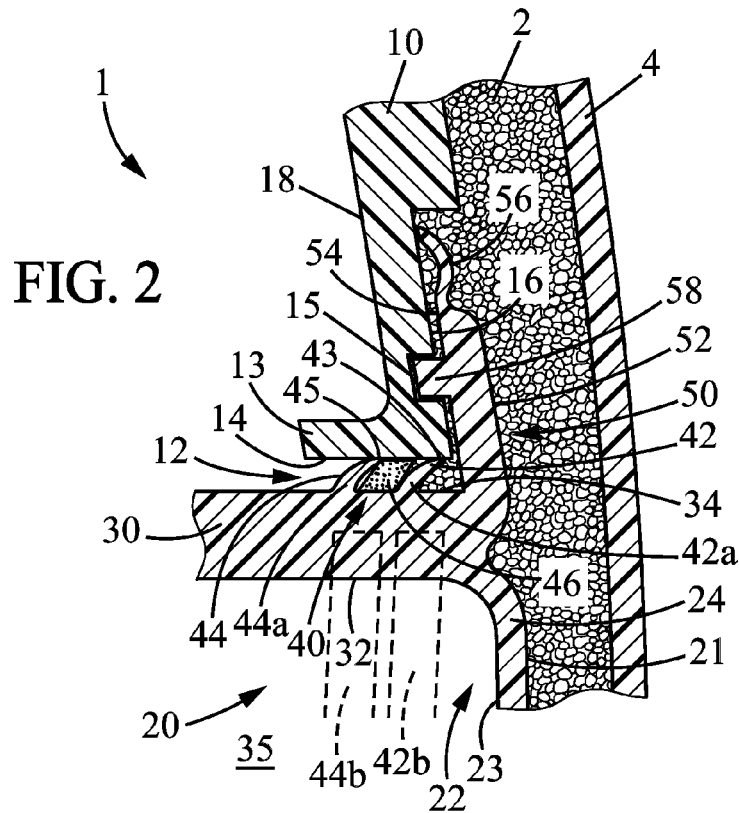
FIG. 2 is a view at enlarged scale of the portion referenced II in FIG. 1 and representing the first embodiment.

In the embodiment illustrated in FIG. 2, the sealing system 40 comprises a first lip 42, an optional second lip 44, and an additional seal 46 which is also optional. The second lip 44 is similar to the first lip 42, but is offset from the first lip 42 in the deployment direction D. The first lip 42 and second lip 44 are integral with (incorporated into) the channel-door assembly 20, in other words are created during the same molding operation and advantageously made in the same material as the channel wall 30, the door portion 22, and the peripheral flange 50. The first lip 42 and second lip 44 project from the outer surface 34 of the channel wall 30 and have a shape that tapers to a respective free end 43, 45 where they come into contact with the inner surface 14 of the support portion 13. The first lip 42 and second lip 44 have a curved shape with the concavity turned towards the foam layer 2 and are flexible so that they deform under the pressure of their free end 43, 45 against the inner surface 14 of the support portion 13.

The additional seal 46 has a shape that is substantially complementary to the space between the first lip 42 and the second lip 44, so that it fits tightly between them and is held in place. If necessary, the additional seal 46 can be glued or similarly retained on the outer surface 34 of the channel wall 30, the first lip 42 and/or the second lip 44. Preferably, the additional seal 46 is more flexible than each of the first lip 42 and second lip 44; the additional seal is advantageously made of an expanded material, such as foam.

In the embodiment illustrated in FIG. 2, the first lip 42 and second lip 44 each comprise four rectilinear portions 42a, 42b; 44a, 44b (only two portions for each of the lips are shown in FIG. 2). The additional seal 46 contacts in a fluidtight manner the outer surface 34 of the channel wall 30, entirely around the passage 12, and the additional seal 46 continuously contacts the inner surface 14 of the body 10, entirely around the deployment direction D, to prevent foam 2 from passing into the passage 12. Alternatively, the additional seal 46 could be limited to sections sealingly connecting the successive rectilinear portions 42a, 42b; 44a, 44b of the first lip 42 and/or second lip 44.

The first lip 42, the second lip 44, and the additional seal 46 prevent the foam 2 from passing through the passage 12 in the body 10, when the foam is injected between the skin 4 on the one hand and the body 10 and channel-door assembly 20 on the other hand.

Figure 3:
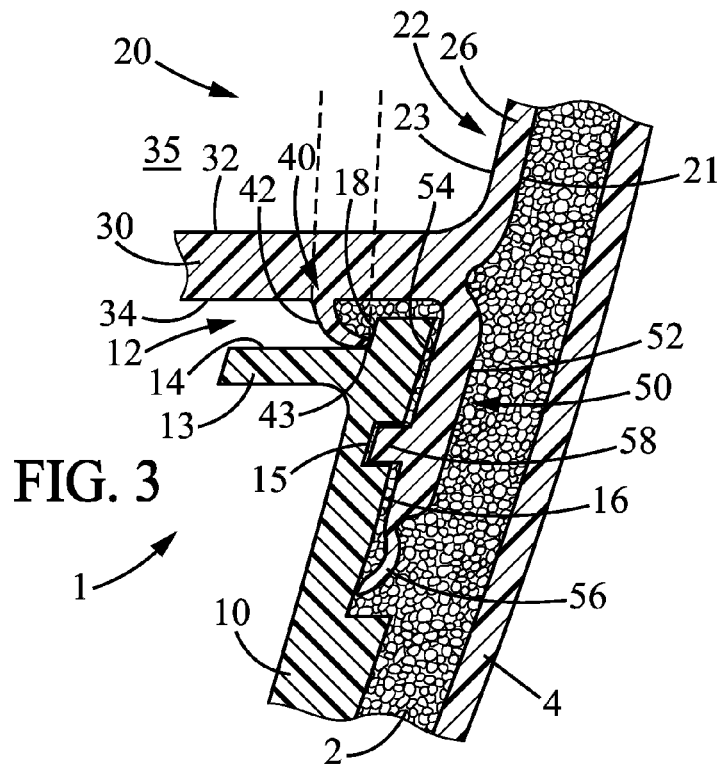
FIG. 3 is a view at enlarged scale of the portion referenced III in FIG. 1 and representing the second embodiment.

In the embodiments illustrated in FIGS. 2 and 3, the sealing system 40 optionally further comprises, upstream of the lip 42 relative to the arrival of the foam 2, a baffle formed by a peripheral groove 15 made in the upper surface 16 of the body 10 entirely around the passage 12, and a peripheral rib 58 projecting from the lower surface 54 of the peripheral flange 50 and fitting into the peripheral groove 15 in a complementary manner. The sealing system 40 further comprises an optional marginal lip 56 on the periphery of the peripheral flange 50 and in continuous contact with the upper surface 16 of the body 10 around the passage 12.

The embodiment shown in FIG. 3 essentially differs from the embodiment shown in FIG. 2 in that the sealing system 40 comprises only one lip 42 and in that the free end 43 of the lip 42 comes into contact with the inner surface 18 of the body 10, said inner surface 18 of the body 10 extending substantially perpendicularly to the deployment direction D. Also, as in the embodiment shown in FIG. 2, the free end 43 of the lip 42 comes into contact with the inner surface 14 of the support portion 13, the support portion 13 being recessed relative to the passage 12.

In the embodiment illustrated in FIG. 3, the lip 42 extends continuously around the outer surface 34 of the channel wall 30. However, alternatively the lip 42 could comprise a plurality of rectilinear portions connected to each other in a fluidtight manner by an additional seal, as shown in FIG. 2, said additional seal may extend continuously or non-continuously around the outer surface 34 of the channel wall 30.

As the lower surface 54 of the peripheral flange 50 bears against the upper surface 16 of the body 10 and in opposition the free end 43 of the lip 42 bears against the lower surface 18 of the body 10, the channel-door assembly 20 is clamped in place on the body 10 along the deployment direction D.

The invention is of course not limited to the embodiment(s) described by way of illustration, not limitation. Thus, in the embodiment illustrated in FIG. 3, the support portion 13, and particularly the inner surface 14 against which the free end 43 of the lip 42 comes into contact in a fluidtight manner, is optional. Thus, although this is not preferred, the free end 43 of the lip 42 could come into contact with only the lower surface 18 of the body 10, in a fluidtight and continuous manner entirely around the passage 12.

The invention claimed is:

1. An interior trim part for a motor vehicle, comprising:
a body forming a structural member and comprising a passage,
a channel-door assembly mounted on the body, said channel-door assembly comprising:
a channel wall which is substantially tubular and has an inner surface and an outer surface, the inner surface surrounding an inside space and being intended to guide the deployment of an air bag towards the passage, the outer surface being substantially cylindrical and extending along a deployment direction,
a door portion connected to the channel wall and overlying the passage, and
a foam layer covering said body and said door portion,
wherein the interior trim part comprises a sealing system extending entirely around said outer surface of the channel wall, continuously contacting said body, the sealing system includes a lip protruding from said outer surface of the channel wall,
wherein the body comprises a support portion having an inner surface of substantially cylindrical shape, defining the passage, extending along the deployment direction and facing the outer surface of the channel wall, and said lip contacts the inner surface of said body.

2. The interior trim part according to claim 1, wherein the lip is integral with the channel wall, the lip and the channel wall forming a single piece.

3. The interior trim part according to claim 1, wherein said lip constitutes a first lip, and the sealing system further comprises a second lip spaced apart from the first lip in the deployment direction.

4. The interior trim part according to claim 3, wherein the sealing system further comprises an additional seal maintained between the first lip and the second lip.

5. The interior trim part according to claim 4, wherein the first lip and the second lip each comprise a plurality of rectilinear portions connected to each other by said additional seal.

6. The interior trim part according to claim 1, forming a dashboard cowl and comprising an airbag module connected to the channel-door assembly.

7. An interior trim part for a motor vehicle, comprising:
a body forming a structural member and comprising a passage, a channel-door assembly mounted on the body, said channel-door assembly comprising:
a channel wall which is substantially tubular and has an inner surface and an outer surface, the inner surface surrounding an inside space and being intended to guide the deployment of an air bag towards the passage, the outer surface being substantially cylindrical and extending along a deployment direction, and
a door portion connected to the channel wall and overlying the passage, a foam layer covering said body and said door portion,
wherein:
the interior trim part comprises a sealing system extending entirely around said outer surface of the channel wall, continuously contacting said body,
the sealing system includes a lip protruding from said outer surface of the channel wall
the sealing system further comprises an additional seal, and
the lip comprises a plurality of rectilinear portions connected to each other by said additional seal.

8. The interior trim part according to claim 7, wherein the additional seal is more flexible than the lip.

9. An interior trim part for a motor vehicle, comprising:
a body forming a structural member and comprising a passage,
a channel-door assembly mounted on the body, said channel-door assembly comprising:
a channel wall which is substantially tubular and has an inner surface and an outer surface, the inner surface surrounding an inside space and being intended to guide the deployment of an air bag towards the passage, the outer surface being substantially cylindrical and extending along a deployment direction, and
a door portion connected to the channel wall and overlying the passage, a foam layer covering said body and said door portion,
wherein:
the interior trim part comprises a sealing system extending entirely around said outer surface of the channel wall, continuously contacting said body,
the sealing system includes a lip protruding from said outer surface of the channel wall
the body comprises an upper surface and a lower surface opposite the upper surface,
the channel-door assembly comprises a peripheral flange extending away from the passage and covering the body, and
the peripheral flange contacts the upper surface of the body and the lip contacts the lower surface of the body, such that the body is clamped between the flange and the lip of the channel-door assembly.

* * * * *